(12) United States Patent
Kurita

(10) Patent No.: US 6,680,801 B2
(45) Date of Patent: Jan. 20, 2004

(54) METHOD OF DESIGNING POSITION OF MICRO-LENS FOR OPTICAL PANEL DEVICE, METHOD OF PRODUCING OPTICAL PANEL DEVICE, AND OPTICAL PANEL DEVICE

(76) Inventor: Shunji Kurita, c/o Sony Corporation, 7-35, Kitashinagawa 6-chome, Shinagawa-ku, Tokyo 141 (JP)

( * ) Notice: Subject to any disclaimer, the term of this patent is extended or adjusted under 35 U.S.C. 154(b) by 383 days.

(21) Appl. No.: 09/829,842

(22) Filed: Apr. 10, 2001

(65) Prior Publication Data

US 2001/0056337 A1 Dec. 27, 2001

(30) Foreign Application Priority Data

Apr. 10, 2000 (JP) .................................... P2000-108210

(51) Int. Cl.[7] .............................................. G02B 27/10
(52) U.S. Cl. ........................................................ 359/619
(58) Field of Search ................................. 359/619, 618, 359/620, 621, 622, 623, 624

(56) References Cited

U.S. PATENT DOCUMENTS 6,559,910 B2 * 5/2003 Suzuki et al. .................. 349/95

* cited by examiner

*Primary Examiner*—Hung Xuan Dang
(74) *Attorney, Agent, or Firm*—Robert J. Depke; Holland & Knight, LLC

(57) ABSTRACT

A minimum frame is set to cover the shape of an opening of each pixel of an optical panel portion, and an intersection between two diagonals of the frame is determined. An X-axis and a Y-axis are set with the intersection between the diagonals taken as a reference point. A ratio between areas, occupied on both sides of the X-axis, of the opening is calculated and a correction amount in the Y-axis direction is calculated on the basis of the area ratio. Similarly, a ratio of areas, occupied on both sides of the Y-axis, of the opening is calculated and a correction amount in the X-axis direction on the basis of the area ratio. The intersection is moved by the correction amounts in the X-axis direction and the Y-axis direction, to obtain plane coordinates. The center position of a micro-lens is aligned to the plane coordinates corresponding to the center of gravity of the opening of the pixel. In this way, the position of a micro-lens is suitably set to the opening of each pixel of the optical panel portion on the basis of the opening shape of the pixel.

13 Claims, 2 Drawing Sheets

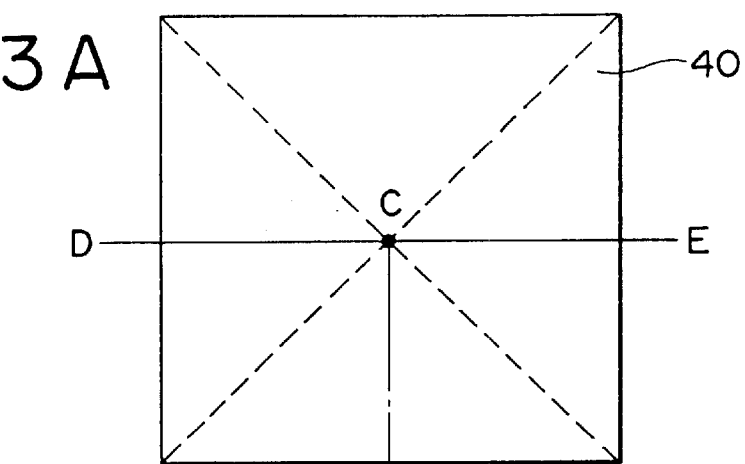
FIG. 3A
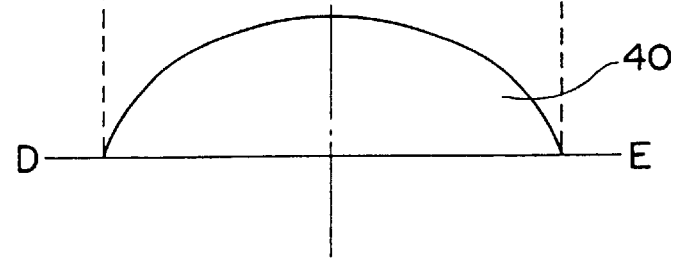
FIG. 3B
FIG. 4
RELATED ART
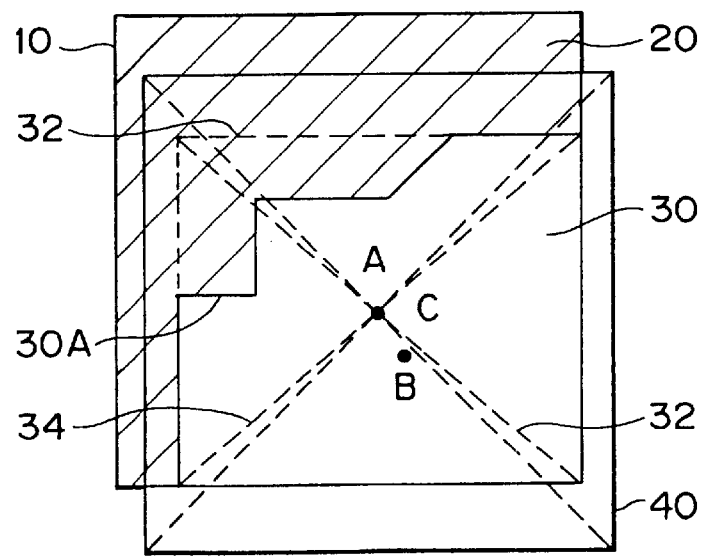

METHOD OF DESIGNING POSITION OF MICRO-LENS FOR OPTICAL PANEL DEVICE, METHOD OF PRODUCING OPTICAL PANEL DEVICE, AND OPTICAL PANEL DEVICE

RELATED APPLICATION DATA

The present application claims priority to Japanese Application No. P2000-108210 filed Apr. 10, 2000, which application is incorporated herein by reference to the extent permitted by law.

BACKGROUND OF THE INVENTION

The present invention relates to an optical panel device such as an LCD display panel used for a finder of various monitors and cam-coders or a CCD image pickup panel used for CCD cameras, a method of producing the optical panel device, and a method of designing a position of a micro-lens for the optical panel device.

There has been known an optical panel device, such as an LCD display panel or a CCD image pickup panel, of a type in which a micro-lens portion for allowing light to be effectively made incident on each pixel of an optical panel portion composed of an LCD or CCD is provided in close-contact with the optical panel portion.

The micro-lens portion includes micro-lenses each having a lens plane corresponding to each pixel of the optical panel portion, wherein the micro-lenses are provided in a matrix pattern corresponding to an arrangement pattern of the pixels. A positional relationship between each micro-lens and an incident opening of the corresponding pixel exerts a large effect on characteristics (quantity of incident light, effective numerical aperture, etc.) of the optical panel device.

The position of each micro-lens for an optical panel device has been determined by adopting a position designing method in which the opening shape of each pixel of an optical panel portion is taken as an imaginary rectangular shape, and the center position of the micro-lens is aligned to an intersection between diagonals of the rectangular shape of the opening, and the optical panel device has been produced in accordance with such a position designing method.

Such a position designing method has a problem that if the opening shape of each pixel is not a rectangular or square shape, the intersection between the diagonals of the imaginary rectangular shape may often be unstable as the center position of a micro-lens, to reduce a lens efficiency (brightness) or to degrade a margin in positional deviation between an optical panel portion and a micro-lens portion.

On the other hand, there has been disposed a position designing method, wherein the shape of an L-shaped opening of a pixel is divided into a plurality of rectangular elements, and the center position of a micro-lens is aligned to an intersection between diagonals of the selected one of the plurality of rectangular elements (see Japanese Patent Laid-open No. Hei 5-315636).

Such a method may often cause the same problem as that described above because the center position of a micro-lens is set on the basis of part of an opening of a pixel.

SUMMARY OF THE INVENTION

An object of the present invention is to provide an optical panel device in which a position of a micro-lens is suitably set to an opening of each pixel of an optical panel portion on the basis of the opening shape of the pixel, a method of producing the optical panel device, and a method of designing a position of a micro-lens for the optical panel device.

To achieve the above object, according to an aspect of the present invention, there is provided an optical panel device including: an optical panel portion having pixels arranged in a matrix pattern; and a micro-lens portion for controlling light to be made incident on each of the pixels of the optical panel portion; wherein the center position of each micro-lens of the micro-lens portion is aligned to the center of gravity of an opening of each pixel of the optical panel device.

According to another aspect of the present invention, there is provided a method of producing an optical panel device including an optical panel portion having pixels arranged in a matrix pattern and a micro-lens portion for controlling light to be made incident on each of the pixels of the optical panel portion, the method including the steps of: calculating plane coordinates corresponding to the center of gravity of an opening of each of the pixels on the basis of the opening shape of the pixel; setting the center position of a micro-lens of the micro-lens portion to the plane coordinates calculated in the coordinate calculating step; and joining the micro-lenses to the optical panel portion at the positions set in the position setting step.

In the method of producing an optical display device according to the present invention, first, in the coordinate calculating step, plane coordinates corresponding to the center of gravity of an opening of each pixel of an optical panel portion are calculated on the basis of the opening shape of the pixel.

For example, if the opening shape of the pixel of the optical panel portion is a linear symmetric polygonal shape having even sides, such as a square shape, a rectangular shape, a parallelogram shape, a regular hexagonal shape, or a regular octagonal shape, the plane coordinates corresponding to the center of gravity of the opening is calculated on the basis of an intersection between diagonals of the opening.

If the opening shape of the pixel is a polygonal shape having a complicated irregular shape other than a linear symmetric polygonal shape having even sides, the plane coordinates corresponding to the center of gravity of the opening are calculated by an individual calculation method matched to the opening shape.

Next, in the position setting step, the center position of the micro-lens of the micro-lens portion is set to the plane coordinates calculated in the coordinate calculating step.

According to a further aspect of the present invention, there is provided a method of designing a position of a micro-lens for an optical panel device including an optical panel portion having pixels arranged in a matrix pattern and a micro-lens portion for controlling light to be made incident on each of the pixels of the optical panel portion, the method including the steps of: calculating plane coordinates corresponding to the center of gravity of an opening of each of the pixels on the basis of the opening shape of the pixel; and setting the center position of a micro-lens of the micro-lens portion to the plane coordinates calculated in the coordinate calculating step.

In the method of designing a position of a micro-lens for an optical display device according to the present invention, first, in the coordinate calculating step, plane coordinates corresponding to the center of gravity of an opening of each pixel of an optical panel portion are calculated on the basis of the opening shape of the pixel.

For example, if the opening shape of the pixel of the optical panel portion is a linear symmetric polygonal shape having even sides, such as a square shape, a rectangular shape, a parallelogram shape, a regular hexagonal shape, or a regular octagonal shape, the plane coordinates corresponding to the center of gravity of the opening is calculated on the basis of an intersection between diagonals of the opening.

If the opening shape of the pixel is a polygonal shape having a complicated irregular shape other than a linear symmetric polygonal shape having even sides, the plane coordinates corresponding to the center of gravity of the opening are calculated by an individual calculation method matched to the opening shape.

Next, in the position setting step, the center position of the micro-lens of the micro-lens portion is set to the plane coordinates calculated in the coordinate calculating step.

With these configurations, since the position of a micro-lens can be suitably set to an opening of each pixel of an optical panel portion on the basis of the opening shape of the pixel, the design of a position of a micro-lens for an optical display device can be desirably performed; an optical display device can be desirably produced by suitably setting the positions of micro-lenses; and such an optical display device can be provided. As a result, it is possible to improve the lens efficiency (brightness) as compared with the related art method, and also to improve a margin of positional deviation between an optical panel portion and a micro-lens portion.

BRIEF DESCRIPTION OF THE DRAWINGS

FIG. 3A is a plan view showing the shape of a lens plane of a micro-lens used for the micro-lens position designing method shown in FIG. 1;

FIG. 3B is a sectional view taken on line D-E of FIG. 3A; and

FIG. 4 is a plan view showing a state in which the position of a micro-lens is set to the position of the pixel having the opening shape shown in FIG. 2 by a related art designing method.

DETAILED DESCRIPTION OF THE PREFERRED EMBODIMENT

Hereinafter, an embodiment of a method of designing a position of a micro-lens for an optical panel device according to the present invention will be described with reference to the drawings.

Figure 1:
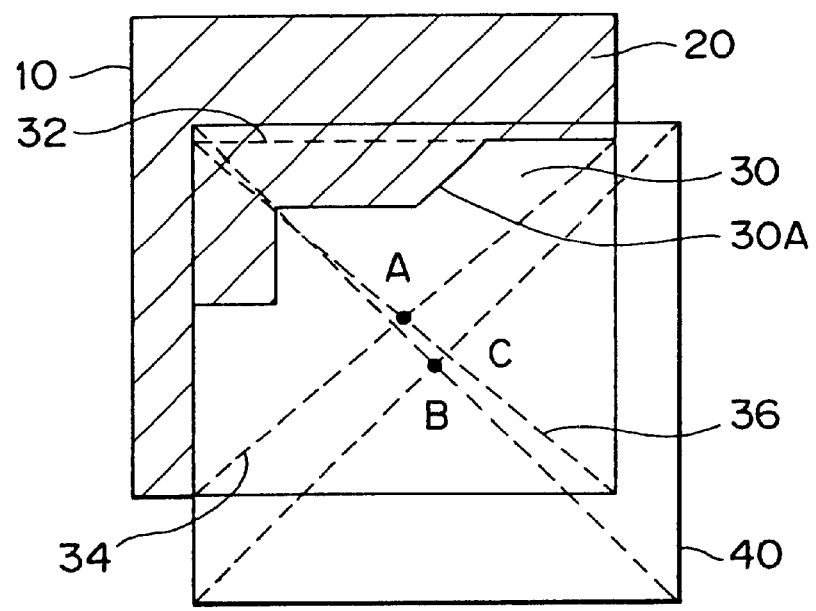
FIG. 1 is a plan view showing an example in which the position of a micro-lens is set to the position of the corresponding one of pixels of an optical panel portion by a micro-lens position designing method according to the embodiment of the present invention.

FIG. 1 is a plan view showing an example in which the position of a micro-lens is set to the position of the corresponding one of pixels of an optical panel portion by a micro-lens position designing method according to the embodiment of the present invention.

Figure 2:
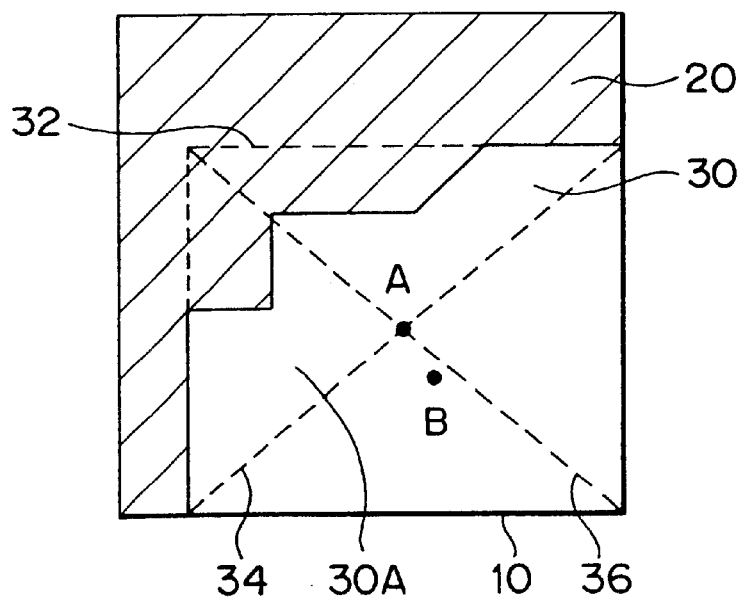
FIG. 2 is a plan view of an opening shape of a pixel used for the micro-lens position designing method shown in FIG. 1.

FIG. 2 is a plan view of an opening shape of a pixel used for the micro-lens position designing method shown in FIG. 1, and FIGS. 3A and 3B are a plan view and a sectional view showing the shape of a lens plane of a micro-lens used for the micro-lens position designing method shown in FIG. 1, respectively.

FIG. 4 is a plan view showing a state in which the position of a micro-lens is set to the position of the pixel having the opening shape shown in FIG. 2 by a related art designing method.

The optical panel device in this embodiment, which is configured as an active-matrix type LCD display panel, includes a liquid crystal panel portion and a micro-lens portion for controlling light to be made incident on each pixel of the liquid crystal panel portion. The liquid crystal panel portion includes a TFT substrate formed by stacking thin film transistors (TFTs) on a transparent substrate, a counter substrate formed by mounting a counter electrode on a transparent substrate, and liquid crystal typically TN liquid crystal sealed between the TFT substrate and the counter substrate. In this optical panel device, each of micro-lenses of the micro-lens portion is aligned to the corresponding one of the pixels, arranged in a matrix pattern, of the liquid crystal panel portion, and is joined thereto by a transparent adhesive or the like. In addition, the micro-lens portion is formed from resins having different refractive indexes by using a stamper.

Such an LCD panel is typically used for LCD projectors, rear projection TVs, and the like.

Referring to FIG. 2, each pixel (TFT pixel) 10 of the liquid crystal panel portion is formed into an approximately square shape, and an opening 30, which allows actual light incidence therethrough, of the pixel 10 is formed into a polygonal shape partially having a complicated irregular portion 30A due to the presence of a shield film 20 (shown by a slant line region in the figure) provided on the pixel 10.

According to this embodiment, plane coordinates (point B in the figure) corresponding to the center of gravity of the polygonal opening 30 are calculated, and the center position (point C in the figure) of a micro-lens 40 is aligned to the plane coordinates (point B).

The method of calculating the plane coordinates corresponding to the center of gravity of the polygonal opening 30 will be described below.

A square or rectangular frame 32 having a minimum size to cover the shape of the opening 30 is set as shown in FIG. 2, and then an intersection (point A in the figure) between two diagonals 34 and 36 of the frame 32 is determined.

The plane coordinates B corresponding to the center of gravity of the opening 30 are calculated on the basis of the intersection A thus determined, for example, in the following procedure.

An X-axis and a Y-axis are set with the intersection A between the diagonals taken as a reference point. A ratio between areas, occupied on both sides of the X-axis, of the opening 30 is calculated and a correction amount in the Y-axis direction is calculated on the basis of the area ratio thus calculated. Similarly, a ratio of areas, occupied on both sides of the Y-axis, of the opening 30 is calculated and a correction amount in the X-axis direction is calculated on the basis of the area ratio thus calculated.

The intersection A is moved by the correction amounts in the X-axis direction and the Y-axis direction, to obtain the plane coordinates B.

The center position C of the micro-lens 40 is aligned to the plane coordinates B corresponding to the center of gravity of the opening 30.

In the related art in which the center position C of the micro-lens 40 is aligned to the intersection A between the diagonals 34 and 36 as shown in FIG. 4, the center position C of the micro-lens 40 is located to a position nearer to the irregular portion 30A of the opening 30, with a result that an incident efficiency is lowered by an amount equivalent to the irregular portion 30A.

On the contrary, in the case of adopting the method according to this embodiment, since the center position C of the micro-lens 40 is aligned to the plane coordinates B corresponding to the center of gravity of the opening 30 as shown in FIG. 1, the center position C of the micro-lens 40 is located to a position slightly apart from the irregular portion 30A of the opening 30. That is to say, the center position C of the micro-lens 40 is located at the plane coordinates B, that is, at the center of gravity of the opening 30 at which the overall shape of the opening 30 has the best balance.

Accordingly, since the convergence position of light passing through the micro-lens 40 corresponds to the center of gravity of the opening 30, it is possible to improve the efficiency of incidence of light to the opening 30 through the micro-lens 40.

After the micro-lenses 40 are thus aligned to the openings 30 of the pixels, the micro-lens portion is stuck on the liquid crystal panel portion by a known method, to obtain an LCD panel according to this embodiment.

In this way, according to the micro-lens position designing method according to this embodiment, the design of the position of the micro-lens can be performed on the basis of the shape of the opening 30 of each pixel, and thereby the efficiency of incidence of light to the opening 30 through the micro-lens 40 can be improved.

As a result, the method in this embodiment exhibits the following effects:

(1) to improve the luminance of an LCD display panel;
 (2) to reduce variations in in-plane luminance;
 (3) to enlarge a margin of positional deviation in registration of the micro-lens portion to the optical panel portion;
 (4) to improve the yield by enlargement of the margin of positional deviation in (3); and
 (5) to improve the quality of products.

In the above-described embodiment, the method of the present invention has been described by example of the polygonal opening 30 having the complicated irregular portion 30A. If the opening 30 is formed into a linear symmetric polygonal shape having even sides, such as a square shape, a rectangular shape, a parallelogram shape, a regular hexagonal shape, or a regular octagonal shape, the above-described plane coordinates corresponding to the center of gravity of the opening 30 can be calculated on the basis of an intersection between diagonals of the opening 30.

The design of a position of a micro-lens corresponding to the opening 30 can be performed by using the intersection of the diagonals of the opening 30.

Even if the opening 30 is formed into a shape other than a polygonal shape having a complicated irregular portion or a linear symmetric polygonal shape having even sides, for example, a polygonal shape having odd sides such as a regular pentagonal shape or a regular heptagonal shape, or a circular shape, an elliptic shape, or a closed curve shape (so-called cloud form), the above-described plane coordinates corresponding to the center gravity of the opening 30 are calculated by using a method of calculating the center of gravity of the opening 30 on the basis of the opening shape, and the center position of a micro-lens is aligned to the plane coordinates thus calculated.

In this way, the present invention can be widely applied to various opening shapes of pixels, and can provide a method of designing the optimum position of a micro-lens and an optical panel device having a good quality. That is to say, the present invention is excellent in universal applicability.

It is to be noted that the method for calculating the center of gravity of each of openings having various shapes is well-known, and therefore, individual description thereof is omitted.

In the above-described embodiment, the present invention is applied to the LCD display panel as the optical panel device; however, the present invention may be applied, for example, to a CCD solid-state image pickup device.

The method of calculating the center of gravity of an opening described in the embodiment is for illustrative purpose only, and the center of gravity of an opening can be calculated by using various mathematical methods.

As described above, according to the present invention, plane coordinates corresponding to the center of gravity of an opening of each pixel of an optical panel portion are calculated on the basis of the shape of the opening, and the center position of a micro-lens of a micro-lens portion is set to the plane coordinates thus calculated.

Accordingly, since the position of a micro-lens can be suitably set on the basis of the opening shape of each pixel of the optical panel portion, it is possible to improve the lens efficiency (brightness) as compared with the related art method, and to improve a margin of positional deviation between the optical panel portion and the micro-lens portion.

While the preferred embodiment of the present invention has been described using the specific terms, such description is for illustrative purposes only, and it is to be understood that changes and variations may be made without departing from the spirit or scope of the following claims.

What is claimed is:

1. A method of designing a position of a micro-lens for an optical panel device including an optical panel portion having pixels arranged in a matrix pattern and a micro-lens portion for controlling light to be made incident on each of the pixels of the optical panel portion, said method comprising the steps of:

calculating plane coordinates corresponding to the center of gravity of an opening of each of the pixels on the basis of the opening shape of the pixel; and
 setting the center position of a micro-lens of the micro-lens portion to the plane coordinates calculated in said coordinate calculating step.

2. A method of designing a position of a micro-lens for an optical panel device according to claim 1, wherein in said coordinate calculating step, if the opening shape of each of the pixels is a linear symmetric polygonal shape having even sides, the plane coordinates corresponding to the center of gravity of the opening are calculated on the basis of an intersection between diagonals of the opening.

3. A method of designing a position of a micro-lens for an optical panel device according to claim 2, wherein the linear symmetric polygonal shape having even sides is selected from a square shape, a rectangular shape, a parallelogram shape, a regular hexagonal shape, a regular octagonal shape, and other regular polygonal shapes having even sides.

4. A method of designing a position of a micro-lens for an optical panel device according to claim 1, wherein in said coordinate calculating step, if the opening shape of each of the pixels is a polygonal shape having a complicated irregular shape other than a linear symmetric polygonal shape having even sides, the plane coordinates corresponding to the center of gravity of the opening are calculated by an individual calculation method matched to the opening shape of the pixel.

5. A method of designing a position of a micro-lens for an optical panel device according to claim 1, wherein the optical panel portion comprises a solid-state image pickup device for converting light, which has been made incident on the solid-state image pickup device through the micro-lenses, into an image signal.

6. A method of designing a position of a micro-lens for an optical panel device according to claim 1, wherein the optical panel portion comprises a liquid crystal display device for allowing light, which has been made incident on the liquid crystal display device through the micro-lenses, to selectively pass therethrough, thereby displaying an image signal.

7. A method of producing an optical panel device including an optical panel portion having pixels arranged in a matrix pattern and a micro-lens portion for controlling light to be made incident on each of the pixels of the optical panel portion, said method comprising the steps of:

calculating plane coordinates corresponding to the center of gravity of an opening of each of the pixels on the basis of the opening shape of the pixel;

setting the center position of a micro-lens of the micro-lens portion to the plane coordinates calculated in said coordinate calculating step; and joining the micro-lenses to said optical panel portion at the positions set in said position setting step.

8. A method of producing an optical panel device according to claim 7, wherein in said coordinate calculating step, if the opening shape of each of the pixels is a linear symmetric polygonal shape having even sides, the plane coordinates corresponding to the center of gravity of the opening are calculated on the basis of an intersection between diagonals of the opening.

9. A method of producing an optical panel device according to claim 8, wherein the linear symmetric polygonal shape having even sides is selected from a square shape, a rectangular shape, a parallelogram shape, a regular hexagonal shape, a regular octagonal shape, and other regular polygonal shapes having even sides.

10. A method of producing an optical panel device according to claim 7, wherein in said coordinate calculating step, if the opening shape of each of the pixels is a polygonal shape having a complicated irregular shape other than a linear symmetric polygonal shape having even sides, the plane coordinates corresponding to the center of gravity of the opening are calculated by an individual calculation method matched to the opening shape of the pixel.

11. A method of producing an optical panel device according to claim 7, wherein the optical panel portion comprises a solid-state image pickup device for converting light, which has been made incident on the solid-state image pickup device through the micro-lenses, into an image signal.

12. A method of producing an optical panel device according to claim 7, wherein the optical panel portion comprises a liquid crystal display device for allowing light, which has been made incident on the liquid crystal display device through the micro-lenses, to selectively pass therethrough, thereby displaying an image signal.

13. An optical panel device comprising:

an optical panel portion having pixels arranged in a matrix pattern; and a micro-lens portion for controlling light to be made incident on each of the pixels of said optical panel portion;

wherein the center position of each micro-lens of said micro-lens portion is aligned to the center of gravity of an opening of each pixel of said optical panel device.

* * * * *